US009823145B2

(12) United States Patent
Rousselin et al.

(10) Patent No.: US 9,823,145 B2
(45) Date of Patent: Nov. 21, 2017

(54) BEARING NUT FOR MEASURING THE ROTATIONAL SPEED OF A SHAFT CONNECTED TO A TURBOMACHINE AND ASSOCIATED MEASURING DEVICE

(71) Applicant: SNECMA, Paris (FR)

(72) Inventors: Stephane Rousselin, Moissy-Cramayel (FR); Jean-Francois Adnot, Moissy-Cramayel (FR); Benoit Mascrier, Moissy-Cramayel (FR)

(73) Assignee: SNECMA, Paris (FR)

( * ) Notice: Subject to any disclaimer, the term of this patent is extended or adjusted under 35 U.S.C. 154(b) by 121 days.

(21) Appl. No.: 14/900,755

(22) PCT Filed: Jun. 24, 2014

(86) PCT No.: PCT/FR2014/051578
§ 371 (c)(1),
(2) Date: Dec. 22, 2015

(87) PCT Pub. No.: WO2014/207369
PCT Pub. Date: Dec. 31, 2014

(65) Prior Publication Data
US 2016/0153848 A1   Jun. 2, 2016

(30) Foreign Application Priority Data

Jun. 26, 2013   (FR) ...................... 13 56162

(51) Int. Cl.
*G01L 3/10* (2006.01)
*F16C 41/00* (2006.01)
(Continued)

(52) U.S. Cl.
CPC .............. *G01L 3/10* (2013.01); *F16C 41/007* (2013.01); *G01L 3/106* (2013.01); *G01P 3/443* (2013.01);
(Continued)

(58) Field of Classification Search
USPC .................................. 324/207.25; 73/114.25
See application file for complete search history.

(56) References Cited

U.S. PATENT DOCUMENTS 4,942,761 A * 7/1990 Batzill .................... G01P 3/488
73/114.25
5,020,968 A   6/1991 Yamada et al.
(Continued)

FOREIGN PATENT DOCUMENTS

| CN | 201597459 U | * 10/2010 |
|----|-------------|-----------|
| DE | 102008042961 | 4/2010 |
| EP | 1526305 | 4/2005 |

OTHER PUBLICATIONS

International Search Report with English Language Translation, dated Nov. 13, 2014, Application No. PCT/FR2014/051578.

*Primary Examiner* — Vincent Q Nguyen
(74) *Attorney, Agent, or Firm* — Blakely Sokoloff Taylor & Zafman LLP

(57) ABSTRACT

A nut screwed around a rotating shaft with a view to securing a part to said shaft and to cooperate with a fixed sensor sensing a quantity of material in a pre-defined volume to measure the speed of rotation of the shaft, including a ring of teeth separated by slots. At least a portion of the teeth includes at least one recess maintaining the clamping function of the ring of teeth, the at least one recess forming, with notches separating the teeth, respective material deficit intervals detected by said sensor when passing through the detection volume during the rotation of the nut. A method of using the nut with a sensor in a rotational speed measuring device and the production of same.

14 Claims, 2 Drawing Sheets

(51) Int. Cl.
*G01P 3/44* (2006.01)
*G01P 3/488* (2006.01)
*G01P 3/483* (2006.01)

(52) U.S. Cl.
CPC .............. *G01P 3/483* (2013.01); *G01P 3/488* (2013.01); *F16C 2360/00* (2013.01)

(56) References Cited

U.S. PATENT DOCUMENTS

| | | |
|---|---|---|
| 5,547,290 A | 8/1996 | Ouchi et al. |
| 2015/0329106 A1* | 11/2015 | Kuwahara ................ B60K 6/48 477/5 |

* cited by examiner

BEARING NUT FOR MEASURING THE ROTATIONAL SPEED OF A SHAFT CONNECTED TO A TURBOMACHINE AND ASSOCIATED MEASURING DEVICE

TECHNICAL FIELD

The present invention relates to measuring the rotational speed of a rotating shaft in a turbine engine. The invention more particularly relates to a device for measuring markers, which are rigidly connected to the shaft, as they pass in front of a sensor.

PRIOR ART

Accurately measuring the rotational speed of the rotor of a turbine engine is extremely important in order to check the proper functioning thereof.

More particularly, in some apparatuses for testing for blade loss, it is necessary to determine the torque passing through the drive shaft of the rotor. This torque is determined by two measurements of the rotational speed of the shaft, on either side of the rotor during tests. Since the torque is derived from the phase difference between these two measurements, the measurements have to be taken with great accuracy.

It is known to carry out this type of measurement by counting marks, distributed on a circle rotating together with the shaft, as they pass in front of a sensor. More precisely, there are capacitive sensors which can measure density variations in a specified field. It is common to use these sensors to measure metal teeth, which are regularly distributed in an annular manner on a metal part attached to the rotor, as they pass by.

The problem with this technology is that it is necessary to provide a specific part that is equipped with this ring of teeth to be indexed with the engine for each speed measurement. Firstly, it is not always obvious to place such a part in a complete engine module, which is how the tests are usually carried out. Secondly, the change introduced by this part could make the tests less representative of the actual operating conditions.

The object of the invention is to provide an accurate and cost-effective speed measurement while hardly changing the features of the rotating assembly of the turbine engine.

DESCRIPTION OF THE INVENTION

The invention relates to a nut which has a specified axis and is intended to be screwed around a rotating shaft in order to rigidly connect a part to said shaft, and to interact with a stationary sensor which senses an amount of material in a specified space in order to measure the rotational speed of the shaft, comprising a ring of teeth which are separated by slots and arranged so as to engage with a clamping tool inserted into at least one slot, said nut being characterised in that at least some of the teeth comprise at least one recess which maintains the function of clamping the ring of teeth, said recesses forming, together with the slots separating the teeth, just as many intervals having less material that are intended to be detected by said sensor when passing through the detection space thereof when the nut rotates.

In this manner, the non-recessed segments on the clamping teeth form a ring of patterns which lead to variations in material density when passing through the measurement field of a stationary sensor, there being more density variations than the number of teeth. A suitable processing system, which can be produced by known means, allows the accuracy of the speed measurement to be improved by comparison with only counting the teeth passing by. It is thus possible to achieve sufficient accuracy when measuring speed and there is no need to include a specific part that disrupts the features of the rotating unit in the apparatus.

Preferably, each tooth comprises at least one recess, the intervals formed by the slots and the recesses have an identical circumferential length and are regularly distributed in azimuth around the axis of the nut.

It is clear that a regular discretisation of the ring into intervals, having less material, between the solid intervals makes it much easier to process the signal sent by the sensor in order to calculate the rotational speed. In addition, this regular arrangement represents a type of optimum since, if the number of intervals is equal, the distribution irregularities on a discretisation prevent the processing from obtaining the speed measurement accuracy that would correspond to a regular discretisation using intervals of the smallest size.

Moreover, if the initial geometry of the ring of teeth allows it, examples show that it is possible to go beyond the factor of two when discretising the blips to be counted, in relation to the number of teeth having a regular discretisation.

Likewise preferably, the recess in the tooth has a constant cross section over its length in the circumferential direction. Material density gaps are thus formed and the measured signal is simpler to process in order to count a number of times they pass in front of the sensor.

Advantageously, the recess is a slot provided on at least one of the longitudinal faces of the tooth in the circumferential direction. This arrangement is simple to produce, for example by machining.

According to a variant, the body of the nut being the portion arranged so as to produce the interface with the shaft and the part to be rigidly connected, the teeth are positioned in the radial extension of the body of the nut. This arrangement corresponds to the conventional design of a clamping nut that is screwed around a shaft to minimise the overall dimensions and to simplify operation using a wrench.

Advantageously, all segments without recesses on the teeth have the same shape, except one which has an increased volume in relation to the others and is capable of being detected by a sensor which senses an amount of material. This arrangement does not change the general frequency of the marks for counting that are formed by the non-recessed segments on the teeth. By contrast, this larger segment creates a "pip" measured by the sensor, which allows the number of rotations of the shaft to be counted.

The invention also relates to a device for measuring rotational speed, in relation to an apparatus, of a shaft connected to a rotor of a rotating machine, comprising a nut as described above which is positioned on the shaft in order to rigidly connect a part thereto, and a sensor which is stationary in relation to the apparatus and the detection space of which is positioned so as to see the teeth passing by when the nut rotates with the shaft, and which is capable of detecting the variations in the amount of material caused by the intervals corresponding to the recesses and the slots.

Since the sensor is focused on the ring, it detects the segments passing by on the basis of the variation in the amount of material passing by in its measurement field, by means of means for processing the signal which belong to the prior art.

Advantageously, the part clamped by the nut is an inner race of the shaft in a bearing.

The invention also relates to a device for measuring a torque imposed by a turbine engine rotor on the shaft passing therethrough, comprising a first device for measuring rotational speed on the shaft upstream of the rotor and a second device for measuring rotational speed on the shaft downstream of the rotor, at least one of said devices for measuring rotational speed being produced as described above.

To carry out the measurements, use is thus made of the nuts on the bearings that hold the drive shaft of the engine module being tested. This makes it possible to take accurate speed measurements and to thus derive therefrom the correct torque for a design that is representative of the operational system.

The invention also relates to a method for producing a nut as described above, which is intended to interact with a stationary sensor that is capable of detecting variations in amounts of material in a specified field, in order to measure the rotational speed of the nut, comprising the following steps:

selecting a nut which is intended to be screwed around a rotatable shaft in order to rigidly connect a part to said shaft and comprises a set of teeth which substantially correspond to portions of a ring having a constant section around the axis of the nut, said teeth forming, together with the slots that separate them, a regular pattern in azimuth around the axis, and being arranged so as to engage with a clamping tool inserted into at least one slot;
  determining the maximum size of the recesses for maintaining the clamping function;
  determining the shape of the recesses to obtain the intervals to be detected by the sensor in addition to the slots between the teeth;
  machining, preferably by milling, the teeth to produce the recesses.

DESCRIPTION OF AN EMBODIMENT OF THE INVENTION

The present invention will be more readily understood and other details, features and advantages of the present invention will become clearer upon reading the following description with reference to the accompanying drawings, in which.

Figure 1:
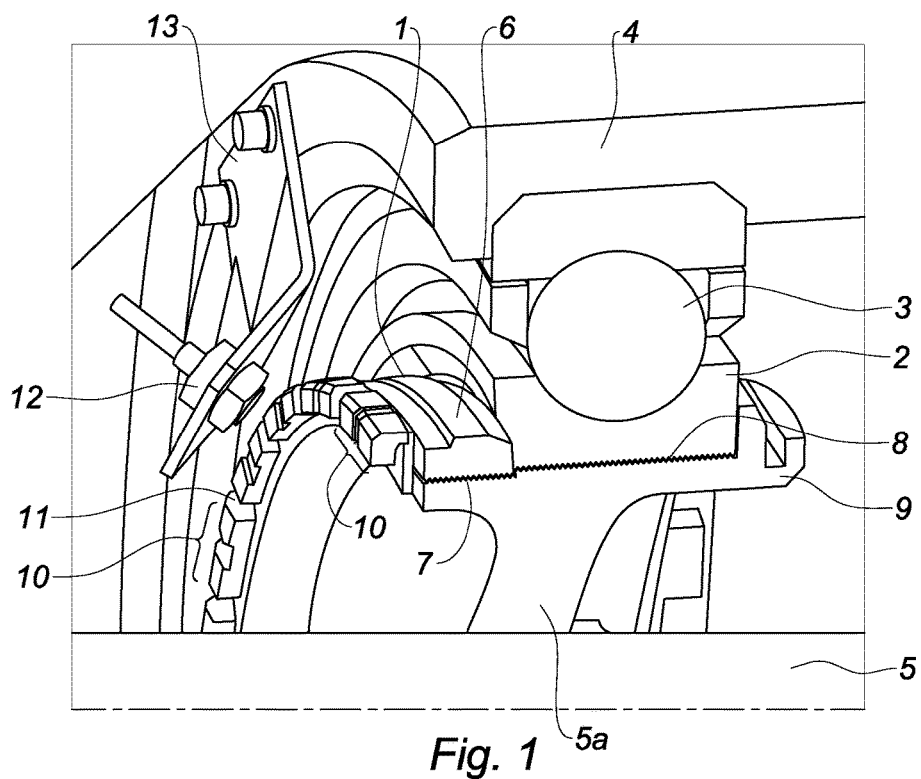
FIG. 1 is a schematic view of a device for measuring the rotational speed of a shaft at a bearing, according to the invention.

As shown in FIG. 1, a nut 1 according to the invention is used to hold the inner race 2 of the ball bearing 3 connected to the bearing 4 through which the shaft 5 passes in rotation. The body 6 of the nut 1 is in the form of a ring having an inner thread 7 which interacts with the thread 8 on the radially external face of an annular platform 9 connected to the shaft 5 by a disc 5a. A ring of teeth 10 is rigidly connected to the body 6 of the nut such that a clamping tool can be inserted into the slots 11 between the teeth 10 in order to screw the nut 1. These teeth 10 form identical, regularly distributed segments of a ring of material that is fixed substantially in the axial extension of the body 6 of the nut, on the side opposite that which rests against the inner race 2 of the bearing. The cross section of the ring, of which segments are formed by the teeth 10, is constant and is substantially rectangular. The ends of the teeth 10 in the circumferential direction correspond to a cross section following a plane that passes through the axis of the nut and define the faces of the slots into which the wrench is inserted. In a variant, the ring of teeth 10 can be integral with the body 6 of the nut 1.

In the example shown in FIG. 1, the device according to the invention for measuring rotational speed by counting makes use of a sensor 12 attached to the bearing 4 by a tab 13. When the nut 1 is clamped to retain the inner race 2, this sensor is oriented towards the position occupied by the ring formed by the teeth 10 separated by the slots 11. The sensor is a capacitive sensor that can measure the density variation in a specified spatial field. In this case, the size of the measurement field thereof substantially corresponds to a segment of the ring formed by the teeth 10 and the slots 11 over a circumferential length of the same size as the characteristic dimensions of the cross section of said ring. Said sensor is thus able to send density measurements to a processing system to make it possible to count when structures taking up more or less space in the cross section of the ring pass by when the nut rotates with the shaft. These structures are the patterns produced by the clamping teeth 10. Since, as described above, the nut 1 according to the invention is produced such that these structures are distributed regularly over the circumference, a person skilled in the art knows to apply suitable signal processing to the measurements from the capacitive sensor in order to discover the rotational speed of the shaft.

In addition, this example demonstrates that the objects in terms of the accuracy of the speed measurements can be achieved. For a shaft rotating at around 4000 rpm, the estimations made according to the method for processing the pulses sent by the sensor indicate that a discretisation of the circumference into 40 teeth is necessary. The clamping nut 1 shown in FIG. 2 first has 24 teeth 10, which is insufficient. On the other hand, by making one recess 14 per tooth as shown in FIG. 2, 50 non-recessed segments 15 are produced, which allows the desired accuracy for the speed variation measurements around 4000 rpm to be obtained.

The clamping force applied to the nut 1 has to be relatively high to allow the nut to hold the inner race 2 in position, taking account of the stresses transmitted between the bearing 4 and the shaft 5 of the turbine engine. So that the teeth can transmit the clamping torque, firstly the cross section of the ring they form has to be sufficient, and secondly they have to have a considerable length in the circumferential direction.

Figure 2:
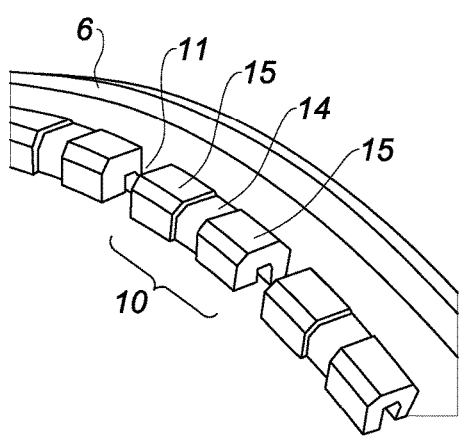
FIG. 2 is a schematic perspective view of the geometry of a sector of a nut according to a first variant of the invention.

In one embodiment, shown in FIG. 2, the circumferential length of the teeth 10 is more than twice that of the slots that separate them. A material recess in the form of an indentation retaining a constant cross-sectional surface area with respect to the ring is centred in the middle of each tooth 10 in the circumferential direction. In this example, the indentation is made over the whole of two external faces of the tooth 10.

The length in the circumferential direction of this recess 14 is substantially equal to that of the slots 11 separating the teeth. In this manner, the non-recessed segments 15 of the teeth separated by the recesses 14 are all of the same length and are regularly spaced over the circumference. The cross section of the recess 14 is such that, firstly, the remaining cross section of material in the tooth 10 is sufficient at the recess 14 to transmit the clamping torque, and secondly the removal of the material is sufficient for the capacitive sensor 12 to detect a density variation. This embodiment of the nut, thus, makes it possible to produce, in combination with the non-recessed segments 15 of teeth, a number of markers to be counted by the sensor 12 that is double the number of teeth 10, and to thus improve the accuracy of the speed measurements by the same factor.

Figure 3:
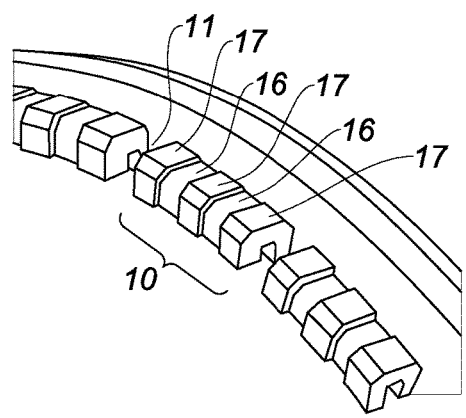
FIG. 3 is a schematic perspective view of the geometry of a sector of a nut according to a second variant of the invention.

FIG. 3 shows a variant of the invention where the circumferential length of the teeth 10 is much greater than twice that of the slots 11 that separate them. Two material recesses 16 having the same shape as that 14 shown in the previous example are made, still having the same length as the slots 11. Furthermore, said recesses are positioned symmetrically in relation to the centre of each tooth 10 in the circumferential direction such that they separate three non-recessed tooth segments 17 of equal length. In relation to the number of teeth, regularly spaced over the circumference, this variant triples the number of markers, to be counted by the sensor 12. In an even more general manner, a minimum length should be taken into account so that a non-recessed segment can be detected by the capacitive sensor. Thus, when the length of the teeth is greater than N times the length of a slot plus N+1 times this minimum length, a variant of the invention involves making N recesses therein, which separate N+1 non-recessed segments of equal length.

Figure 4:
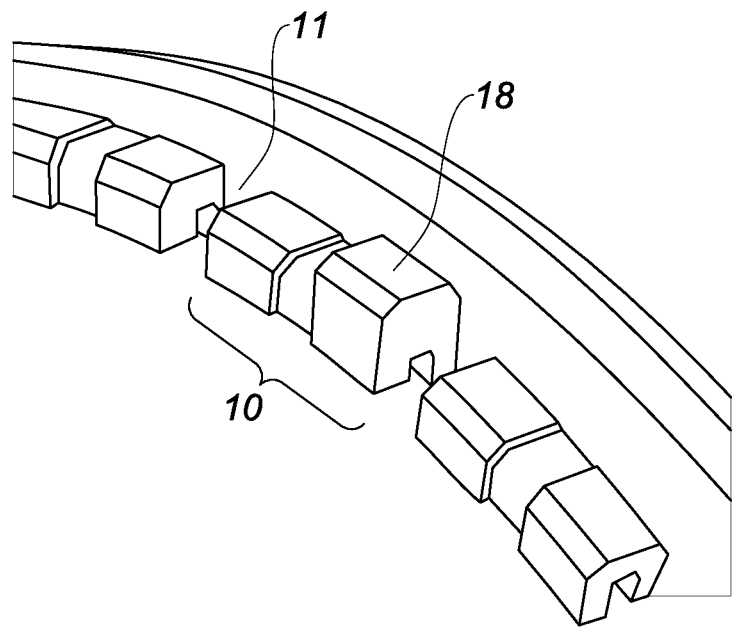
FIG. 4 is a schematic perspective view of the geometry of a sector of a nut according to a third variant of the invention.

In another variant, which is shown in FIG. 4 but can be implemented regardless of the number of recesses, 14 or 16, per tooth 10, one clamping tooth of the nut 1 has a single non-recessed segment 18 having a cross-sectional surface area that is greater than that of the ring defining the cross section of all the teeth 10. This is obtained, for example, by slightly increasing the height of the tooth on this segment 18. In addition, this cross-sectional increase is reduced to the minimum required for the material increase in the field of the sensor 12 to be detected. Thus, the structure of the pattern of the teeth 10 having the non-recessed segments, 15 or 17, and 18, remains fundamentally regular with the teeth 10 being present substantially in a ring having a constant cross section, but where the one segment 18 of a larger cross section provides a setting signal to the capacitive sensor 12.

It is within the scope of the invention to produce a nut 1 that is capable of measuring speed from existing nuts that are designed to simply hold the inner race 2. A nut according to the invention differs from the prior art on account of the presence of the recesses 15, 17 and 18. To produce a nut 1 according to the invention, the first step is naturally to check that the geometry of the ring of teeth will allow a sufficient number of recesses to be made in order to achieve the desired accuracy in the speed measurement. One example has already been provided in this respect with reference to FIG. 2. The method then involves firstly defining the clamping torque that has to be applied in order to retain the ring 2 and which determines the minimum material cross section for the segments 14 or 16 corresponding to the recesses. Then, the size of the recess 14 or 16 is defined, adhering to said necessary restriction according to the sensitivity of the sensor 12 used for the counting. Lastly, the teeth 10 of the existing nut are machined, preferably milled, to produce the recesses 14 or 16 thus defined and to obtain the regularly spaced segments 15 or 17. The setting segment 18 can be produced by slightly reducing the cross section of the set of teeth of the original nut, except at the point where said segment 18 is to be located.

Figure 5:
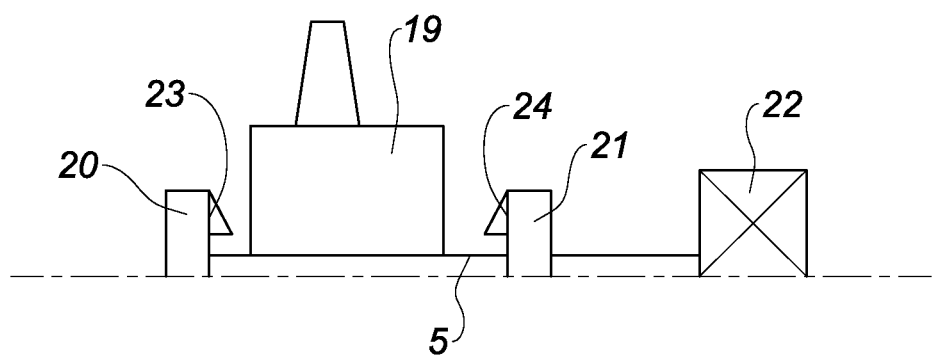
FIG. 5 is a schematic view of a blade loss testing apparatus of an engine module using the invention.

This invention is used, for example, on a blade loss testing machine as shown in FIG. 5. The shaft 5 of the engine module 19 is attached upstream to a first bearing 20 and downstream to a second bearing 21. In this case, the terms upstream and downstream are to be understood in relation to the orientation of the engine during operating conditions having an incident flow. The shaft 5 of the engine is coupled downstream of the second bearing 21 to a system 22 that drives the engine 19 at a selected speed. In this usage, a first measuring device 23 according to the invention is fitted on the upstream bearing 20 and second measuring device 24 is fitted on the downstream bearing 21, still according to the invention in the example described, though this is not limiting. Preferably, the nuts 1 attached to the shaft entering each of the measuring devices, 23 and 24, comprise the single setting tooth segment 18 that has a greater cross section than the others. The apparatus also comprises calculation means having the modules capable of processing the data from the capacitive sensors 12 in order to calculate an instantaneous speed of the shaft 5 at each bearing 20 and 21, and having the modules capable of calculating the torque transmitted to the shaft 5, on the basis of the phase differences between these speed measurements.

This embodiment of the invention should not limit the usage conditions thereof. Firstly, a person skilled in the art would know to adapt this type of rotational speed measurement of a turbine engine shaft by using a nut for clamping a bearing race at the passage through a bearing that holds said shaft to any other type of testing or operating apparatus. In addition, it is part of the invention to use this type of nut to attach a rotating part to the shaft, if it is expedient to carry out rotational speed measurements at this point.

The invention claimed is:

1. Nut which has a specified axis and releasably screwed around a rotating shaft in order to rigidly connect a part to said shaft, and to interact with a stationary sensor which senses an amount of material in a specified space in order to measure the rotational speed of the shaft, said nut comprising a ring of teeth which are separated by slots and arranged so as to engage with a clamping tool inserted into at least one slot, wherein at least one teeth comprises at least one recess which maintains the function of clamping the ring of teeth, said recess forming, together with the slots separating the teeth, just as many intervals having less material to be detected by said sensor when passing through the detection space thereof when the nut rotates.

2. Nut according to claim 1, wherein, each tooth comprises at least one recess, said slots and recesses forming intervals which have an identical circumferential length and are regularly distributed in azimuth around the axis of the nut.

3. Nut according to claim 2, wherein the recess in the tooth has a constant cross section over its length in the circumferential direction.

4. Nut according to claim 3, wherein the recess is a slot provided on at least one of the longitudinal faces of the tooth in the circumferential direction.

5. Nut according to claim 1, wherein, the body of the nut being the portion arranged so as to produce the interface with the shaft and the part to be rigidly connected, the teeth are positioned in the radial extension of the body.

6. Nut according to claim 1, wherein each tooth comprises a segment without recess separated by a recess, all segments without recesses on the teeth have the same shape, except one which has an increased volume in relation to the others and is capable of being detected by a sensor which senses an amount of material.

7. Device for measuring the rotational speed, in relation to an apparatus, of a shaft connected to a rotor of a rotating machine, comprising a nut according to claim 1 positioned on the shaft in order to rigidly connect the part thereto, and a sensor which is stationary in relation to the apparatus and the detection space of which is positioned so as to see the teeth passing by when the nut rotates around the shaft, and which is capable of detecting variations in the amount of material caused by the intervals corresponding to the recesses and the slots.

8. Device according to claim 7, wherein the part clamped by the nut is an inner race of the shaft in a bearing.

9. Device for measuring a torque imposed by a turbine engine rotor on the shaft passing therethrough, comprising a first device for measuring a rotational speed on the shaft upstream of the rotor and a second device for measuring a rotational speed on the shaft downstream of the rotor, at least one of said devices for measuring a rotational speed being produced according to claim 7.

10. Method for producing a nut according to claim 2, for interacting with a sensor that is capable of detecting variations in amounts of material in a specified space, in order to measure the rotational speed of the nut, comprising the following steps:

selecting a nut intended to be screwed around a shaft rotatable about its axis in order to rigidly connect a part to said shaft, and comprising a set of teeth which substantially correspond to segments of a ring having a constant cross section around the axis of the nut, said teeth forming, together with the slots that separate them, a regular pattern in azimuth around the axis, and being arranged so as to engage with a clamping tool inserted into at least one slot;

determining the maximum size of the recesses to maintain the clamping function;

determining the shape of the recesses to obtain the intervals to be detected by the sensor in addition to the slots between the teeth;

machining, preferably by milling, the teeth to produce the recesses.

11. Nut according to claim 1, wherein it comprises a radially inner thread which interacts with a radially external thread of the shaft.

12. Nut according to claim 1, wherein the nut comprises an annular body extending along the specified axis and having a radial face, said teeth extending axially from the radial face.

13. Nut according to claim 1, wherein the recess presents a first height which is lower than the second height of the slot.

14. Nut comprises a body having a longitudinal axis and releasably screwed around a rotating shaft in order to rigidly connect a part to said shaft, and to interact with a stationary sensor which senses an amount of material in a specified space in order to measure the rotational speed of the shaft, said nut comprising a ring of teeth which are separated by slots and arranged so as to engage with a clamping tool inserted into at least one slot, wherein at least one teeth comprises at least one recess which maintains the function of clamping the ring of teeth, said recess forming, together with the slots separating the teeth, just as many intervals having less material to be detected by said sensor when passing through the detection space thereof when the nut rotates, the body being a ring in one piece.

\* \* \* \* \*